United States Patent
Lai

(10) Patent No.: US 8,248,021 B2
(45) Date of Patent: Aug. 21, 2012

(54) SOLAR ENERGY STORING SYSTEM AND METHOD WITH CHANGEABLE ELECTRICAL CONNECTIONS BETWEEN RECHARGEABLE BATTERIES

(75) Inventor: Chih-Chen Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 403 days.

(21) Appl. No.: 12/576,338

(22) Filed: Oct. 9, 2009

(65) Prior Publication Data
US 2010/0277115 A1 Nov. 4, 2010

(30) Foreign Application Priority Data
Apr. 30, 2009 (CN) .......................... 2009 1 0302001

(51) Int. Cl.
*H01M 10/44* (2006.01)
*H01M 10/46* (2006.01)
(52) U.S. Cl. ...................................................... 320/101
(58) Field of Classification Search .................. 320/101, 320/103, 107, 112, 114, 116, 118, 119, 120, 320/122; 136/291, 293
See application file for complete search history.

(56) References Cited

U.S. PATENT DOCUMENTS

| | | | |
|---|---|---|---|
| 2002/0146617 A1* | 10/2002 | Johnson et al. | 429/50 |
| 2009/0015191 A1* | 1/2009 | Benckenstein et al. | 320/102 |
| 2009/0072781 A1* | 3/2009 | Takahashi et al. | 320/101 |
| 2009/0079383 A1* | 3/2009 | Fornage et al. | 320/101 |

* cited by examiner

*Primary Examiner* — Edward Tso
(74) *Attorney, Agent, or Firm* — Altis Law Group, Inc.

(57) ABSTRACT

A solar energy storing system includes a solar energy converting unit, a rechargeable battery unit, a charging unit, a switch unit, a detecting unit, and a controlling unit. The solar energy converting unit converts solar energy into electrical energy to generate a charging voltage. The rechargeable battery unit stores the electrical energy. The rechargeable battery unit includes a plurality of rechargeable batteries. The charging unit charges the rechargeable battery unit using the charging voltage. The switch unit changes electrical connections between the rechargeable batteries. The detecting unit detects the charging voltage and a voltage of each of the rechargeable batteries and determines a charging status between the charging voltage and the voltages of the rechargeable batteries. The controlling unit controls the switch unit to change the electrical connections between the rechargeable batteries according to the charging status between the charging voltage and the voltages of the rechargeable batteries.

8 Claims, 5 Drawing Sheets

SOLAR ENERGY STORING SYSTEM AND METHOD WITH CHANGEABLE ELECTRICAL CONNECTIONS BETWEEN RECHARGEABLE BATTERIES

BACKGROUND

1. Technical Field

The present disclosure relates to solar energy technology, and particularly, to a solar energy storing system and method.

2. Description of Related Art

Due to the growing demand of clean energy, solar energy converting devices are widely used in recent years.

Generally, when in use, a solar energy converting device is electrically connected to a rechargeable battery unit. The rechargeable battery unit includes a plurality of rechargeable batteries connected in series. An output voltage (also known as a charging voltage) of the solar energy converting device is proportional to an intensity of ambient light. When the intensity of ambient light decreases, the output voltage is decreased, which may be less than an open-circuit voltage of the rechargeable battery unit. Under this condition, the rechargeable battery unit will not be charged by the solar energy converting device. Thus, electrical energy converted by the solar energy converting device is wasted.

Therefore, a solar energy storing system and method, which can overcome the above mentioned problems, are desired.

DETAILED DESCRIPTION

Figure 1:
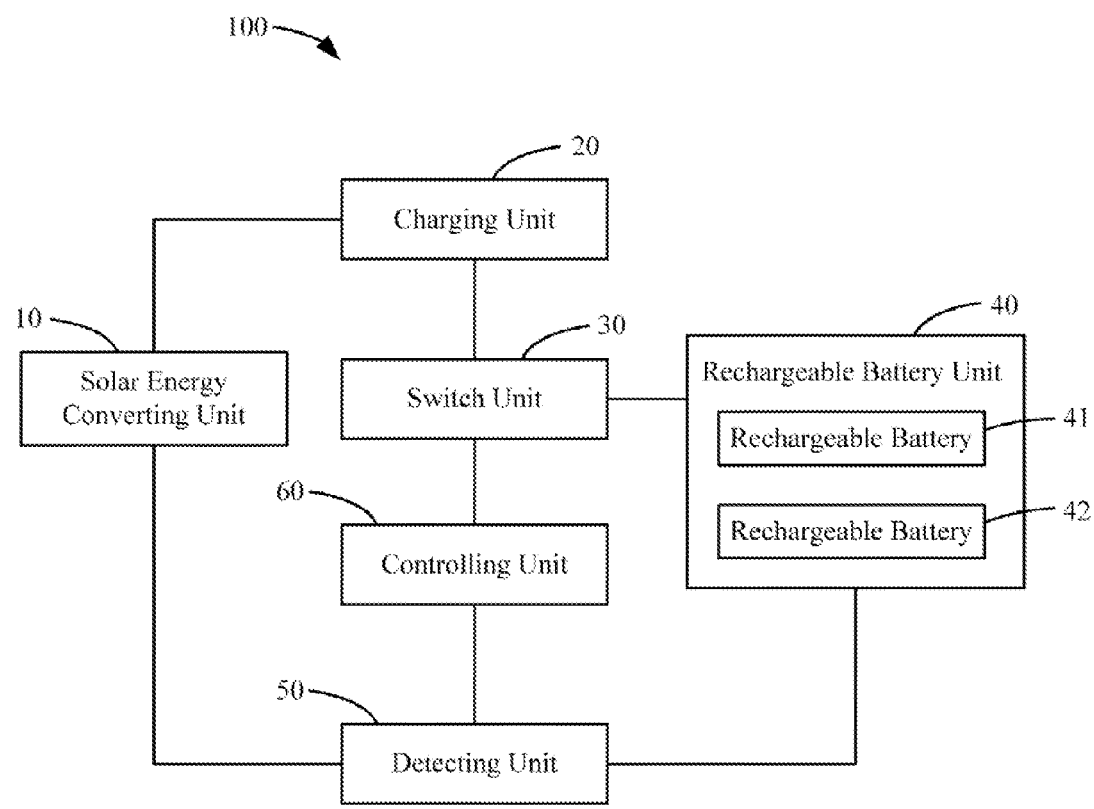
FIG. 1 is a functional block diagram of a solar energy storing system including a switch unit, according to a first exemplary embodiment.

Referring to FIG. 1, a solar energy storing system 100, according to an exemplary embodiment, is shown. The solar energy storing system 100 includes a solar energy converting unit 10, a charging unit 20, a switch unit 30, a rechargeable battery unit 40, a detecting unit 50 and a controlling unit 60. The rechargeable battery unit 40 includes two rechargeable batteries 41, 42 in the illustrated embodiment.

The solar energy converting unit 10 is configured for converting solar energy into electrical energy to generate a charging voltage. The solar energy converting unit 10 may include a plurality of solar cells, such as solar cells made from monocrystalline silicon wafers.

The charging unit 20 is configured for charging the rechargeable battery unit 40 using the charging voltage. The charging unit 20 may include many available charging circuits and/or chips to achieve the charging function. In other alternative embodiments, the charging unit 20 may be integrated with the rechargeable battery unit 40.

The switch unit 30 is configured for changing electrical connections between two rechargeable batteries 41, 42 in the rechargeable battery unit 40. For example, the rechargeable batteries 41, 42 connected in series may be changed by the switch unit 30 to be connected in parallel, or the rechargeable batteries 41, 42 connected in parallel may be changed by the switch unit 30 to be connected in series.

The rechargeable battery unit 40 is configured for storing the electrical energy converted by the solar energy converting unit 10.

The detecting unit 50 is configured for detecting the charging voltage of the solar energy converting unit 10 and a voltage of each of rechargeable batteries 41, 42 in the rechargeable battery unit 40, and determining a charging status between the charging voltage and the voltages of the rechargeable batteries 41, 42.

The controlling unit 60 is configured for controlling the switch unit 30 to change the electrical connections between the rechargeable batteries 41, 42 according to the charging status between the charging voltage and the voltages of the rechargeable batteries 41, 42. As mentioned above, changing the electrical connections may result in the rechargeable batteries 41, 42 being connected in series or parallel.

Figure 2:
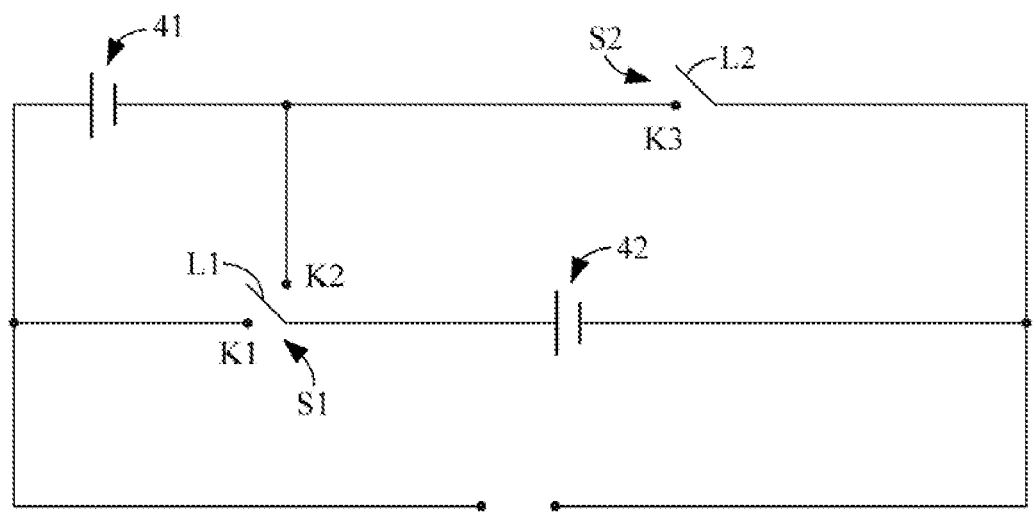
FIG. 2 is a circuit diagram of one embodiment of the switch unit of FIG. 1.

Referring to FIG. 2, the switch unit 30 includes a selection switch S1 and a switch S2. The selection switch S1 includes a first end K1, a second end K2 and a first pole L1. The switch S2 includes a third end K3 and a second pole L2.

The first end K1 is connected to the anode of the rechargeable battery 41. The second end K2 is connected to the cathode of the rechargeable battery 41. The first pole L1 is connected to the anode of the rechargeable battery 42. The third end K3 is connected to the cathode of the rechargeable battery 41. The second pole L2 is connected to the cathode of the rechargeable battery 42.

Before the rechargeable battery unit 40 is charged, the detecting unit 50 detects two voltages V1, V2 of the rechargeable batteries 41, 42 and the charging voltage V generated by the solar energy converting unit 10 and determines the charging status between the charging voltage V and the voltages V1, V2.

If $V>(V1+V2)$, the controlling unit 60 controls the first pole L1 to contact the second end K2 and controls the switch S2 to open. Therefore, the two rechargeable batteries 41, 42 are connected in series, and the rechargeable battery unit 40 is charged by the charging voltage V.

If $V<(V1+V2)$, $V>V1$, $V>V2$ and V1 is about equal to V2, the controlling unit 60 controls the first pole L1 to contact the first end K1 and controls the second pole L2 to contact the third end K3. Therefore, the two rechargeable batteries 41, 42 are connected in parallel and the rechargeable battery unit 40 is charged by charging voltage V.

The solar energy storing system 100 can charge the rechargeable battery unit 40 even when the charging voltage generated by the solar energy converting unit 10 is less than sum of voltages of each of rechargeable batteries 41, 42 of the rechargeable battery unit 40. Therefore, the solar energy storing system 100 can enhance utilization ratio of the solar energy.

Figure 3:
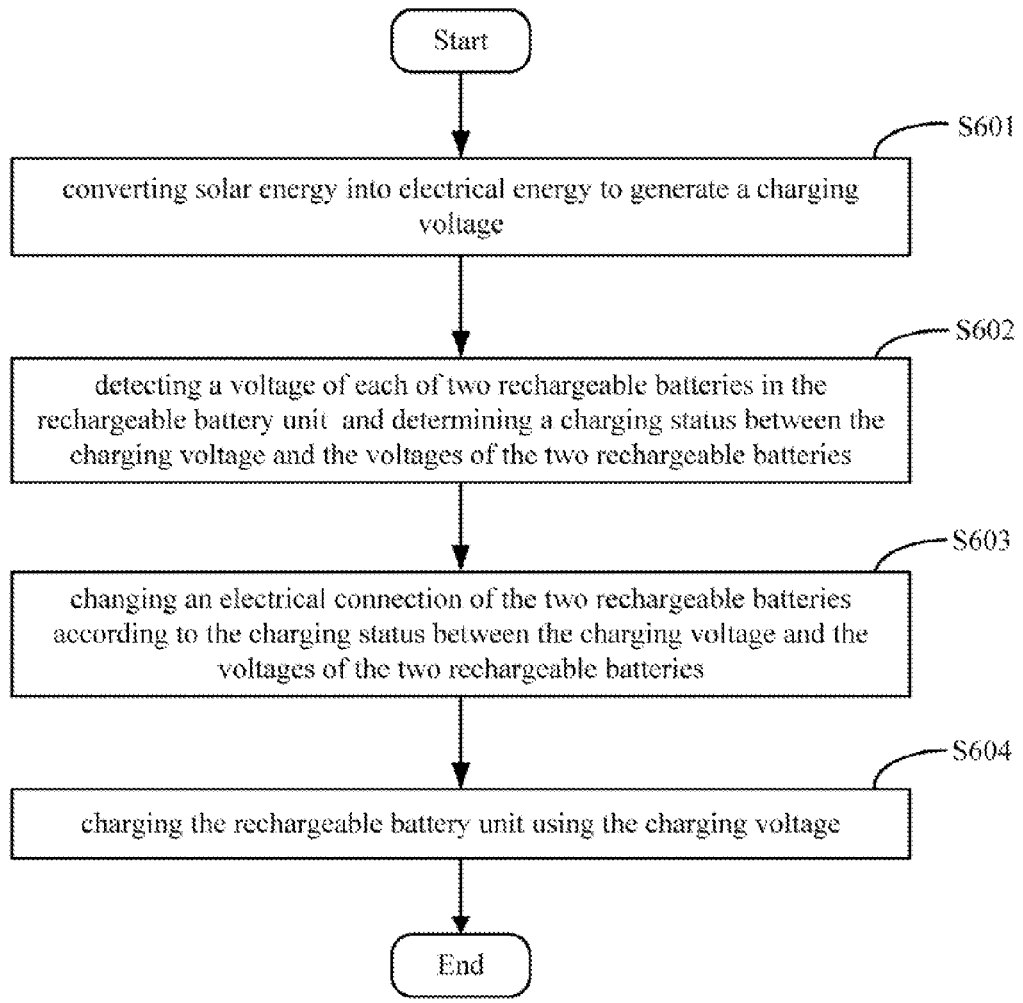
FIG. 3 is a flow chart of a solar energy storing method, according to a second exemplary embodiment.

Referring to FIG. 3, a solar energy storing method, according to a second exemplary embodiment, is shown. The method includes steps S601 to S604. S601: converting solar energy into electrical energy to generate a charging voltage. S602: detecting a voltage of each of two rechargeable batteries 41, 42 in the rechargeable battery unit 40 and determining a charging status between the charging voltage and the voltages of the two rechargeable batteries 41, 42. S603: changing an electrical connection of the two rechargeable batteries 41, 42 according to the charging status between the charging voltage and the voltages of the two rechargeable batteries 41, 42. S604: charging the rechargeable battery unit 40 using the charging voltage.

It can be understood that the solar energy storing method can be carried out by the solar energy storing system 100.

Figure 4:
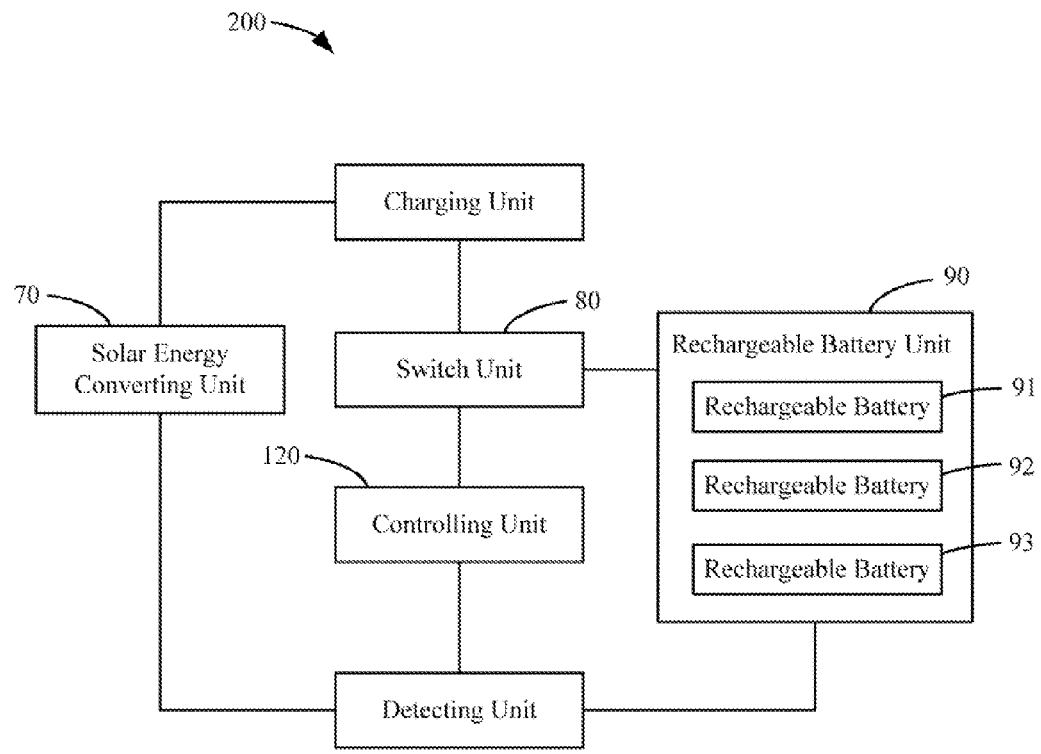
FIG. 4 is a function block diagram of a solar energy storing system including a switch unit, according to a third exemplary embodiment.

Referring to FIG. 4, a solar energy storing system 200, according to a third exemplary embodiment, is shown. Differences between the solar energy storing system 200 and the solar energy storing system 100 of the first exemplary embodiment are that the switch unit 80 and the rechargeable battery unit 90 are different.

Figure 5:
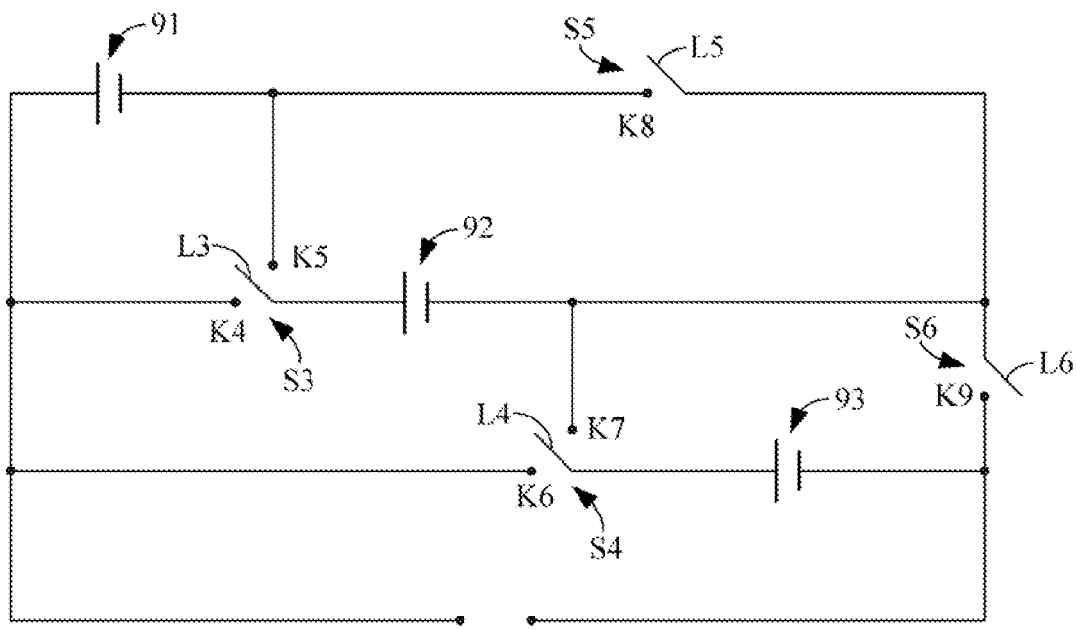
FIG. 5 is a circuit diagram of one embodiment of the switch unit of FIG. 4.

The rechargeable battery unit 90 includes three rechargeable batteries 91, 92, 93. Further referring to FIG. 5, the switch unit 80 includes a first selection switch S3, a second selection switch S4, a first switch S5 and a second switch S6.

The first selection switch S3 includes a first end K4, a second end K5 and a first pole L3. The second selection switch S4 includes a third end K6, a fourth end K7 and a second pole L4. The first switch S5 includes a fifth end K8 and a third pole L5. The second switch S6 includes a sixth end K9 and a fourth pole L6.

The first end K4 is connected to the anode of the rechargeable battery 91. The second end K5 is connected to the cathode of the rechargeable battery 91. The first pole L3 is connected to the anode of the rechargeable battery 92. The third end K6 is connected to the anode of the rechargeable battery 91. The fourth end K7 is connected to the cathode of the rechargeable battery 92. The second pole L4 is connected to the anode of the rechargeable battery 93. The fifth end K8 is connected to the cathode of the rechargeable battery 91. The third pole L5 is connected to the cathode of the rechargeable battery 92. The sixth end K9 is connected to the cathode of the rechargeable battery 93. The fourth pole L6 is connected to the cathode of the rechargeable battery 92.

If V>(V1+V2+V3), the controlling unit 120 controls the first pole L3 to contact the second end K5, and controls the second pole L4 to contact the fourth end K7, and controls the first switch S5 and the second switch S6 to open, where V represents as the charging voltage generated by the solar energy converting unit 70, V1 represents as the voltage of the rechargeable battery 91, V2 represents as the voltage of the rechargeable battery 92, and V3 represents as the voltage of the rechargeable battery 93. Thus, the three rechargeable batteries 91, 92, 93 are connected in series.

If V<(V1+V2+V3), V>V1, V>V2, V>V3 and V1 is about equal to V2 and V2 is about equal to V3, the controlling unit 120 controls the first pole L3 to contact the first end K4, and controls the second pole L4 to contact the third end K6 and controls the third pole L5 to contact the fifth end K8 and controls the fourth pole L6 to contact the sixth end K9. Thus, the three rechargeable batteries 91, 92, 93 are connected in parallel.

Advantages of this exemplary embodiment are same as those of the first exemplary embodiment.

It can be understood that in other alternative exemplary embodiments, the rechargeable battery unit can include more than three rechargeable batteries.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A solar energy storing system, comprising:
a solar energy converting unit configured for converting solar energy into electrical energy to generate a charging voltage;
a rechargeable battery unit configured for storing the electrical energy, the rechargeable battery unit comprising a plurality of rechargeable batteries;
a charging unit configured for charging the rechargeable battery unit using the charging voltage;
a switch unit configured for changing electrical connections between the rechargeable batteries;
a detecting unit configured for detecting the charging voltage and a voltage of each of the rechargeable batteries and determining a charging status between the charging voltage and the voltages of the rechargeable batteries; and
a controlling unit configured for controlling the switch unit to change the electrical connections between the rechargeable batteries according to the charging status between the charging voltage and the voltages the rechargeable batteries.

2. The solar energy storing system of claim 1, wherein the rechargeable battery unit comprises a first rechargeable battery and a second rechargeable battery.

3. The solar energy storing system of claim 2, wherein the switch unit comprises a selection switch and a switch; the selection switch comprises a first end, a second end and a first pole, and the switch comprises a third end and a second pole; the first end is connected to the anode of the first rechargeable battery; the second end is connected to the cathode of the first rechargeable battery; the first pole is connected to the anode of the second rechargeable battery; the third end is connected to the cathode of the first rechargeable battery; the second pole is connected to the cathode of the second rechargeable battery.

4. The solar energy storing system of claim 1, wherein the rechargeable battery unit comprises a first rechargeable battery, a second rechargeable battery and a third rechargeable battery.

5. The solar energy storing system of claim 4, wherein the switch unit comprises a first selection switch, a second selection switch, a first switch and a second switch; the first selection switch comprises a first end, a second end and a first pole; the second selection switch comprises a third end, a fourth end and a second pole; the first switch comprises a fifth end and a third pole; the second switch comprises a sixth end and a fourth pole; the first end is connected to the anode of the first rechargeable battery; the second end is connected to the cathode of the first rechargeable battery; the first pole is connected to the anode of the second rechargeable battery; the third end is connected to the anode of the first rechargeable battery; the fourth end is connected to the cathode of the second rechargeable battery; the second pole is connected to the anode of the third rechargeable battery; the fifth end is connected to the cathode of the first rechargeable battery; the third pole is connected to the cathode of the second rechargeable battery; the sixth end is connected to the cathode of the third rechargeable battery; the fourth pole is connected to the cathode of the second rechargeable battery.

6. The solar energy storing system of claim 1, wherein the solar energy converting unit comprises a plurality of solar cells.

7. The solar energy storing system of claim 6, wherein the solar cells are made from monocrystalline silicon wafers.

8. A solar energy storing method, comprising:

converting solar energy into electrical energy to generate a charging voltage;

detecting a voltage of each of rechargeable batteries in a rechargeable battery unit and determining a charging status between the charging voltage and the voltages of the rechargeable batteries;

changing an electrical connection of the rechargeable batteries according to the charging status between the charging voltage and the voltages of the rechargeable batteries; and charging the rechargeable battery unit using the charging voltage.

* * * * *